United States Patent
Beisiegel et al.

(10) Patent No.: US 7,480,916 B2
(45) Date of Patent: Jan. 20, 2009

(54) EXPLOITING SERVICES IN AN INTEGRATED DEVELOPMENT ENVIRONMENT

(75) Inventors: Michael Beisiegel, Poughkeepsie, NY (US); Hesham E. Fahmy, Mississauga (CA); Piotr Przybylski, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 10/267,407

(22) Filed: Oct. 9, 2002

(65) Prior Publication Data

US 2003/0074217 A1    Apr. 17, 2003

(30) Foreign Application Priority Data

Oct. 12, 2001    (CA) .................................... 2358681

(51) Int. Cl.
G06F 9/44    (2006.01)
(52) U.S. Cl. ..................... 719/311; 717/102; 717/100
(58) Field of Classification Search ................ 719/310, 719/311; 709/203, 219; 717/100, 102
See application file for complete search history.

(56) References Cited

U.S. PATENT DOCUMENTS

| | | |
|---|---|---|
| 5,448,701 A | 9/1995 | Metz, Jr. et al. |
| 5,655,148 A | 8/1997 | Richman et al. |
| 5,870,559 A | 2/1999 | Leshem et al. |
| 5,872,966 A | 2/1999 | Burg |
| 5,974,549 A | 10/1999 | Golan |
| 5,999,990 A | 12/1999 | Sharrit et al. |
| 6,078,743 A | 6/2000 | Apte et al. |
| 6,085,120 A | 7/2000 | Schwerdtfeger et al. |
| 6,199,081 B1 | 3/2001 | Meyerzon et al. |
| 6,266,716 B1 | 7/2001 | Wilson et al. |
| 6,272,556 B1 * | 8/2001 | Gish .......................... 719/315 |
| 6,424,991 B1 * | 7/2002 | Gish .......................... 709/203 |

(Continued)

FOREIGN PATENT DOCUMENTS

EP    1061444 A2    12/2000

OTHER PUBLICATIONS

"Integrating data and transactions for agile e-business." Websphere Applicaiton Server, Version 4.0, IBM Corporation, Aug. 2001; retrieved from <http://www-306.ibm.com/software/webservers/appserv/whitepapers/wp_was_overview.pdf> on Aug. 30, 2006.*

(Continued)

*Primary Examiner*—Meng-Ai An
*Assistant Examiner*—Nathan Price
(74) *Attorney, Agent, or Firm*—Martin J. McKinley; Law Office of Jim Boice

(57) ABSTRACT

Presented herein is a method and computer program product for generating, in an Integrated Development Environment (IDE), a software application that is designed to exploit services of multiple Enterprise Information Systems (EISs). In one embodiment, the method associates each of multiple Resource and Tooling Adapters (RTAs) with a selected one of multiple Enterprise Information Services (EISs). A software application, which uses multiple EISs and is developed through development facilities of an Integrated Development Environment (IDE), is identified. Source code that is used to access the services of the multiple EISs is generated by plugging multiple corresponding RTAs into the IDE. Using plugged-in multiple corresponding RTAs in the IDE, data is provided, to the IDE, that describes services available from the multiple EISs to the software application.

20 Claims, 9 Drawing Sheets

U.S. PATENT DOCUMENTS

| | | | |
|---|---|---|---|
| 6,721,777 B1 * | 4/2004 | Sharma | 718/101 |
| 6,738,975 B1 * | 5/2004 | Yee et al. | 719/310 |
| 6,766,361 B1 * | 7/2004 | Venigalla | 709/217 |
| 6,976,061 B1 * | 12/2005 | Sharma | 709/220 |
| 7,016,966 B1 * | 3/2006 | Saulpaugh et al. | 709/230 |
| 2003/0018832 A1 * | 1/2003 | Amirisetty et al. | 709/328 |

OTHER PUBLICATIONS

Bates, Jon and Tim Tompkins, "Using Visual C++ 6," Que, 1998; pp. 627-646 and 705-730.*

Silberschatz et al., "Applied Operating System Concepts," First Edition, John Wiley & Sons, Inc., 2000; pp. 87-89.*

St Clair, D. "Good Vibes With Java" Unix Review, vol. 15, No. 9, pp. 59-62, Aug. 1997, USA (this is a copy of the NPL cited on IDS filed Mar. 31, 2008).*

Gruber, M. "Universal Plug-and-Play (UPNP) System With Linux Device Proxy" Elektronik, vol. 50, No. 7, pp. 120-123, Apr. 3, 2001, Germany (this a copy of the NPL cited on IDS filed Mar. 31, 2008).*

St Clair, D. "Good Vibes With Java" Unix Review, vol. 15, No. 9, pp. 59-62, Aug. 1997, USA.

Gruber, M. "Universal Plug-and-Play (UPNP) System With Linux Device Proxy" Elektronik, vol. 50, No. 7, pp. 120-123, Apr. 3, 2001, Germany.

Cruickshank, J. "EIS—Icing on the Cake?" British Journal of Healthcare Computing & Information Management, vol. 11, No. 10, pp. 10-11, Dec. 1994.

Sharma, R. "J2EE Connector Architecture" Java.Sun.Com/J2EE/Connector/.

* cited by examiner

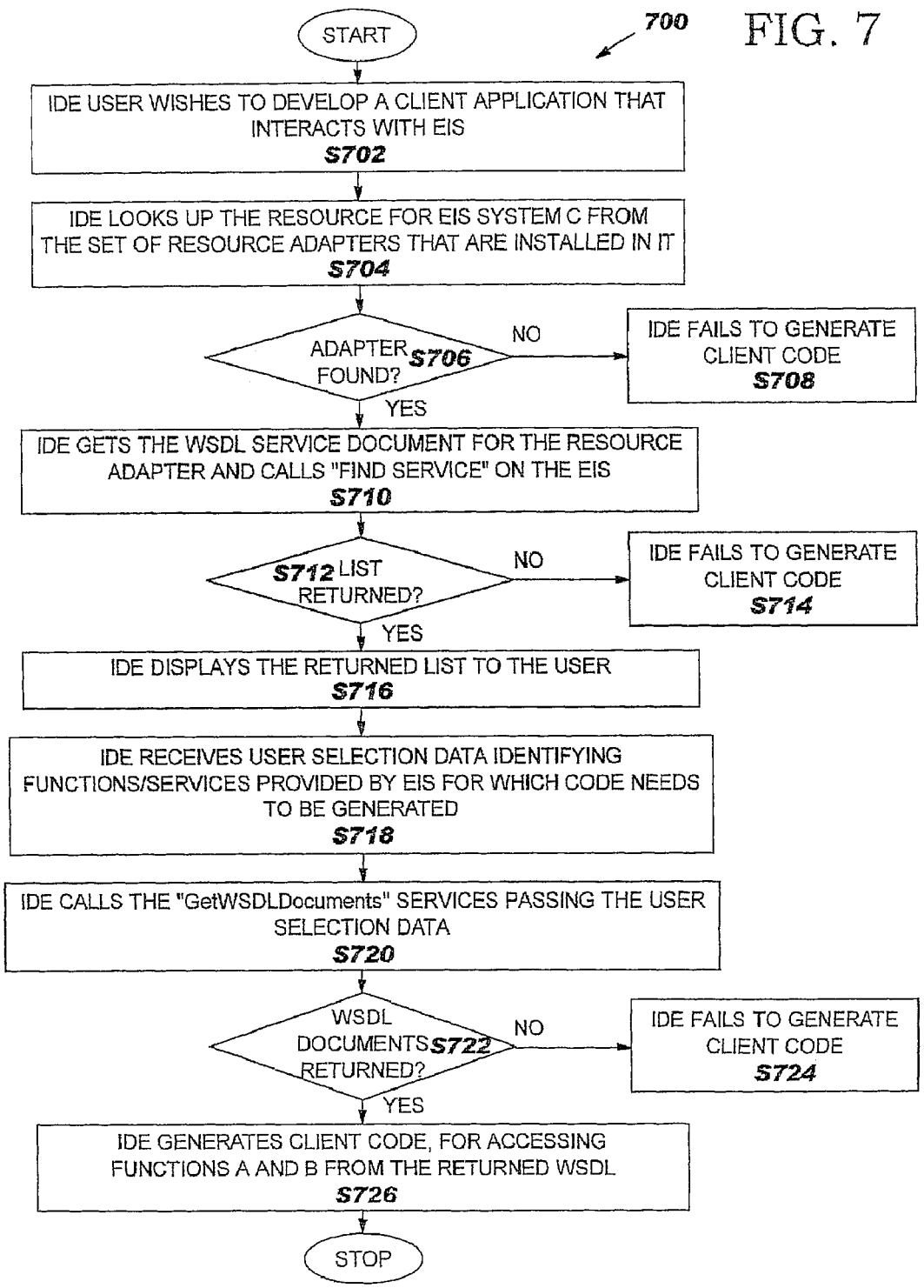

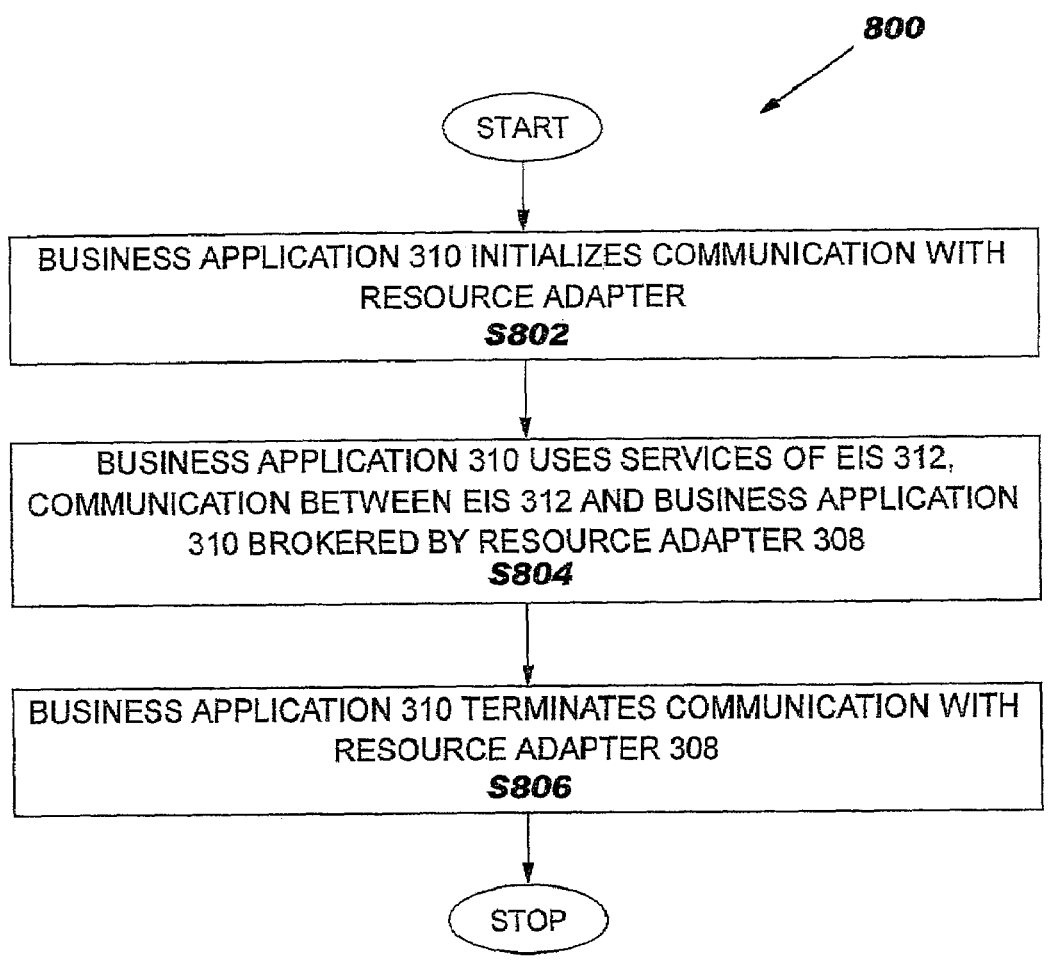

EXPLOITING SERVICES IN AN INTEGRATED DEVELOPMENT ENVIRONMENT

BACKGROUND OF THE INVENTION

1. Field of the Invention

The present invention relates to application development and operation and, more particularly, to resource adapters and the development of applications using an integrated development environment.

2. Description of the Related Art

As a result of the widespread use and development of electronic commerce (e-commerce, whereby transactions for a variety of goods and services are conducted electronically) and electronic business (e-business, whereby business processes, e.g., shipping, procurement, staffing, etc., are transformed so as to be conducted electronically), applications have been, and continue to be, developed to interact with numerous back end systems to access and store information related to an e-business or e-commerce transaction. For example, an e-business application, designed to provide for web based purchasing of goods or services, may need to interact with numerous back end systems to ensure that a good or service purchased is delivered on time to the customer making the purchase. Such a transaction, while apparently simple, may involve numerous back end systems (sometimes referred to as Enterprise Information Systems (EISs) related to: parts procurement, receiving, manufacturing or Enterprise Resource Planning (ERP) systems, shipping, accounting and many others. Additionally, many of these EISs, often the result of many years of development and storing vast amounts of data, were often not created to interact easily with other systems (i.e., these legacy EISs were often stand alone systems). As a result of this complexity, the development of a single business application which interacts with one or more EISs to provide for one or more e-business services is the effort of much research and development.

To address the complexity in developing a business application, resource adapters have been developed which ease the difficulty for interaction between a business application and an EIS. The resource adapter (also sometimes referred to as a "connector") acts as an intermediary or broker between an EIS and a business application. A resource adapter architecture generally defines a standard set of services that allow developers to quickly connect and integrate their business applications with virtually any back end enterprise information system. Resource adapters typically are supplied by the developer of the EIS. A resource adapter (or connector) appears as a component (or library) specific to an EIS that provides connectivity to the EIS. It is possible to conceptualize the resource adapter's function as analogous to a Java™ Database Connector (JDBC) driver, which is a programming interface that lets Java applications access data in a relational database. Java is a trademark of Sun Microsystems, Inc.

Without the use of resource adapters, business application developers often do not fully appreciate the complexities involved in leveraging established enterprise applications and end up spending too much time understanding and coding to each particular EIS's integration APIs (if APIs are even available). Then, the hand-coded logic they develop often provides narrow opportunities for reuse, because it is application-specific by design.

However, resource adapters are not without their own problems. Firstly, each resource adapter is typically specific to a single EIS. As such, for "n" number of EISs, "n" resource adapters need to be created. This is often not too problematic in isolation. However, the EIS-specific nature of a resource adapter is coupled with the fact that the resource adapters, which are used at runtime (i.e., during execution of a business application), require adapter tools to be created (typically by the manufacturer or provider of the resource adapter) that are used by an Integrated Development Environment (IDE) to create a business application that can utilize the corresponding resource adapter. As such, a resource adapter is not only specific to the EIS with which it is designed to interact, but the tooling which corresponds to the resource adapter is also specific to an IDE. As a result, if tooling is to be created for "m" number of IDEs, "m" adapter tools will also need to be created. Therefore, for a provider of resource adapter-tool sets to provide resource adapter-tool sets for "n" number of EISs and "m" number of IDEs will require the creation of "m"x"n" resource adapter-tool sets to be created. This is an extremely time consuming and costly undertaking. As such, developers of business applications are typically limited to using an adapter-tool set from the EIS supplier and, possibly, using an IDE that the developer typically does not use as their normal or preferred IDE is not supported by the adapter-tool set.

As such, a resource adapter tooling architecture which addresses some or all of these shortcomings is desired.

SUMMARY OF THE INVENTION

Presented herein is a method and computer program product for generating, in an Integrated Development Environment (IDE), a software application that is designed to exploit services of multiple Enterprise Information Systems (EISs).

In one embodiment, the method comprises receiving, in an Integrated Development Environment (IDE), data indicating that a software application is being developed for an application that requires an interaction with needed services from multiple Enterprise Information Services (EISs). The IDE includes a Graphical User Interface (GUI) that has multiple windows for viewing source code, project files, and debugging information. In response to the data being received, the IDE queries whether Resource and Tooling Adapters (RTAs) that provide an IDE with access to needed multiple EISs are available. If not, then a warning is issued stating that the multiple EISs are not accessible through the required RTAs. However, if the required RTAs for accessing the multiple EISs are available, a query is transmitted to the required RTAs requesting identification of the needed services that are provided from the multiple EISs with which the required RTAs are associated. The needed services are located and presented in a separate window in a Graphical User Interface (GUI) that is supported by the multiple EISs. In response to the needed services being presented, the IDE receives data that is indicative of which needed services are selected by a user. In response to the IDE receiving the data that is indicative of which needed services are selected by the user, a "get documents" command is invoked from the IDE to the required RTAs. This "get documents" command instructs the required RTAs to locate abstract services documents, in the required RTAs, that provide abstract descriptions of the needed services provided by the multiple EISs. In response to the "get documents" command succeeding in locating the abstract services documents as a result of communication between the required RTAs and the needed multiple EISs, the IDE generates code that accesses the needed services for the software application, wherein the needed services are provided by the needed multiple EISs.

In one embodiment, the method comprises associating each of multiple Resource and Tooling Adapters (RTAs) with a selected one of multiple Enterprise Information Services (EISs). A software application that is being developed through development facilities of an Integrated Development Environment (IDE) is identified. This software application requires the use of services provided by multiple EISs. The multiple EISs include at least one database describing transaction servers available to the software application. The IDE provides a developer with a development environment using a Graphical User Interface (GUI), and the GUI includes multiple windows for viewing source code, project files, and debugging information. Source code that is necessary to access the services of the multiple EISs is generated by plugging multiple corresponding RTAs into the IDE. Using plugged-in multiple corresponding RTAs in the IDE, data is provided, to the IDE. that describes services available from the multiple EISs to the software application, such that there is no direct communication between the software application and the multiple RTAs while the software application is under development in the IDE, and thus the software application is aware of the multiple RTAs only during runtime.

In one embodiment, the method comprises associating a single Resource and Tooling Adapter (RTA) with multiple Enterprise Information Services (EISs). A software application that is being developed through development facilities of an Integrated Development Environment (IDE) is identified. This software application requires use of services provided by multiple EISs. and the multiple EISs include at least one database describing transaction servers available to the software application. The IDE provides a developer with a development environment using a Graphical User Interface (GUI) that includes multiple windows for viewing source code, project files, and debugging information. Source code that is necessary to access the services of the multiple EISs is generated by plugging the single RTA into the IDE. Through a plugged-in single RTA, data is provided to the IDE. This data describes services available from the multiple EISs to the software application, such that there is no direct communication between the software application and the single RTA while the software application is under development in the IDE, and thus the software application is aware of the single RTA only during runtime.

BRIEF DESCRIPTION OF THE DRAWINGS

In the figures which illustrate an example embodiment of this invention:

FIG. 7 illustrates a flow chart of operations performed during the development of a business application illustrated in FIG. 4; and FIG. 8 illustrates a flow chart of operations performed during the execution a business application.

DESCRIPTION OF THE PREFERRED EMBODIMENT

Figure 1:
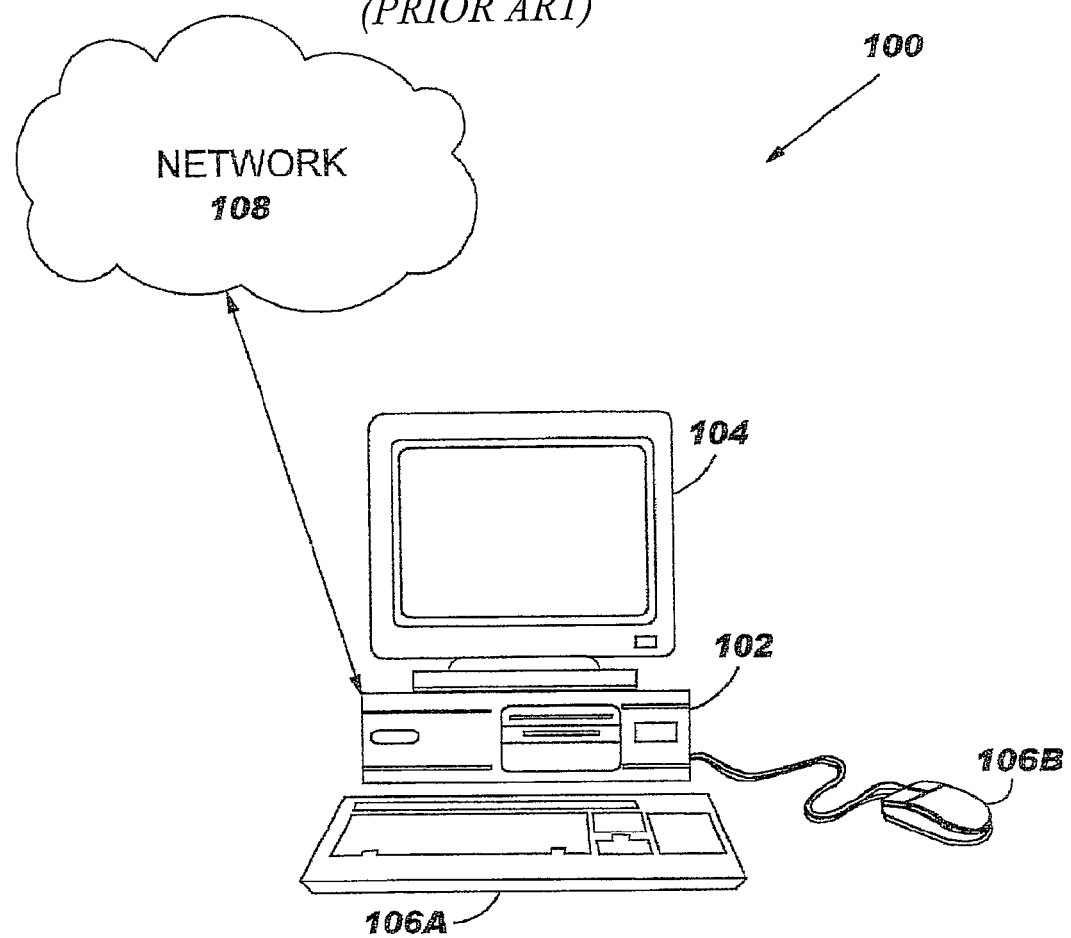
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device (computer system 100).

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
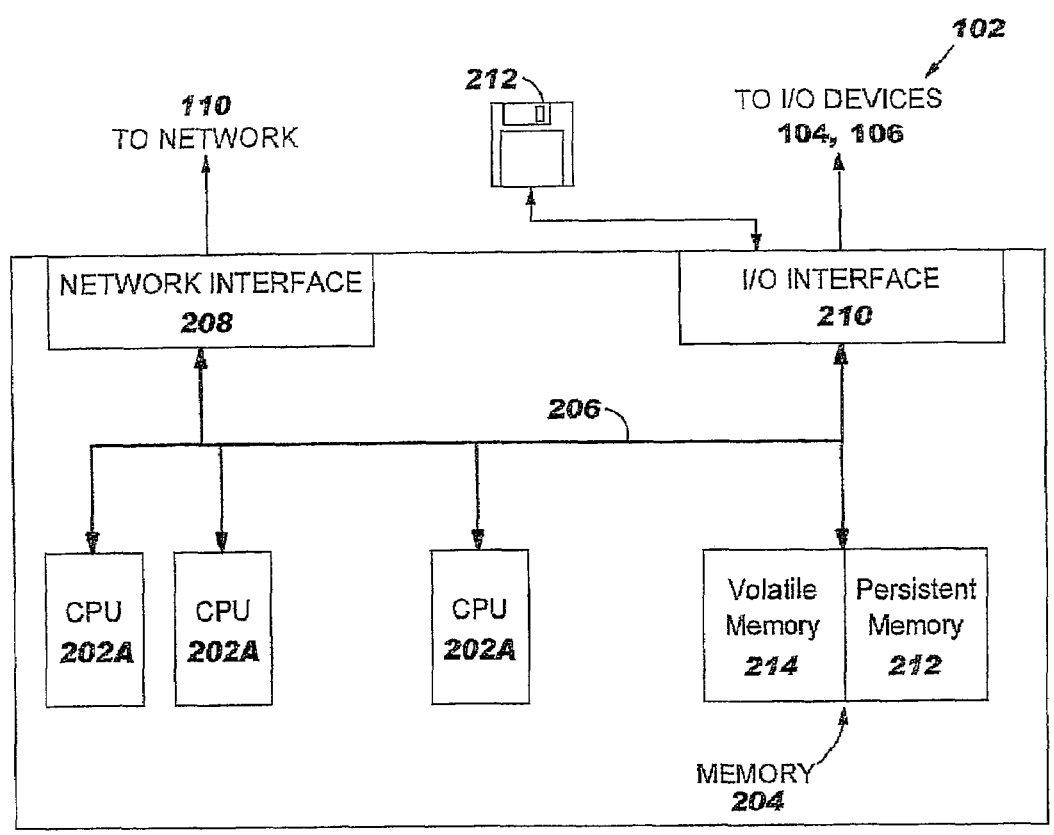
FIG. 2 schematically illustrates, in greater detail, a portion of the computer system of FIG. 1.

Exemplary processing system 102 is illustrated in greater detail in FIG. 2. As illustrated, processing system 102 includes several components, including central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 110. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device. Zip is a trademark of Iomega Corporation. Note further that persistent memory such as flash cards, CD-ROMs, static memory devices and the like may store data and instructions readable by a computer system that executes an integrated development environment (IDE) for generating a business application to access a service provided by an Enterprise Information System (EIS), as described herein.

Figure 3:
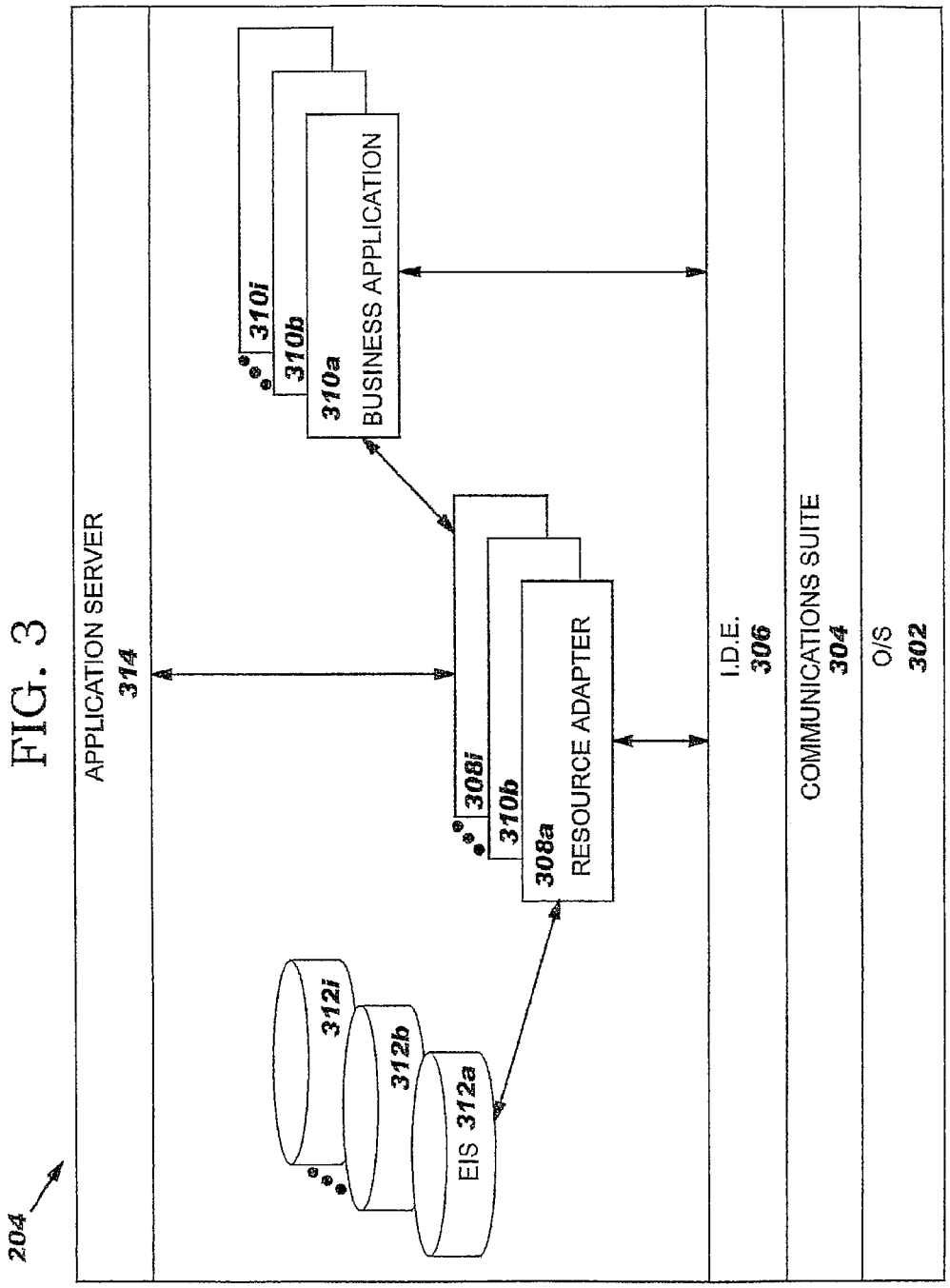
FIG. 3 illustrates, in functional block form, a portion of the memory illustrated in FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 204 stores operating system (OS) 302, communications suite 304, IDE 306, resource adapters 308a, 308b, ..., 308i, business applications 310a, 310b, ..., 310i, EISs 312a, 312b, ..., 312i and application server 314.

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through interaction with OS 302 and network I/F 208 (FIG. 2), suitable communication protocols to enable communication with other networked computing devices via network 110 (FIG. 1). Communication suite 304 may include one or more of such protocols such as TCP/IP, ethernet, token ring and the like.

Also stored in memory 204 (and used during the development process) and incorporating aspects of the present invention is Integrated Development Environment (IDE) 306. In the exemplary embodiment, IDE 306 provides a developer (or a team of developers) a development environment using a graphical user interface (GUI) known to those skilled in the art. The GUI typically includes a number of windows or panes for viewing source code, project files, debugging information or the like. Unlike conventional IDEs, IDE 306 is adapted to have one or more resource tooling adapters (RTAs) 308 (described in detail below) "plugged in". That is, IDE 306 is adapted to communicate with one or more RTAS 308 serially or simultaneously. Through communication with RTAS 308, IDE 306 is able to assist developers in developing a business application 310 which is designed to use the services provided by one or more selected EISs 312. The operation of IDE 306 and its interaction with a RTA 308 and a business application 310 is better understood with reference to FIGS. 4 and 7 described below.

RTAs 308a, 308b, ..., 308i (collectively RTAS 308), during the development process of a business application 310, communicate with, or plug into, IDE 306. Each RTA 308 corresponds to a selected EIS 312. That is, each RTA 308 in the exemplary embodiment is specific to a particular EIS 312. The RTAs (resource and tooling adapters) embody a new type of resource adapter that may be employed during both development of a business application and runtime (i.e., execution) of the business application.

It should be noted that, in alternative embodiments, a single RTA 308 could be employed to communicate (either serially or simultaneously) with more than one EIS 312. This may be particularly advantageous if there exists a high degree of similarity between the more than one EISs 312.

The RTAs in the exemplary embodiment are adapted from the Java 2, Enterprise Edition (J2EE) Connector Architecture. The J2EE Connector architecture, some aspects of which are described below, is described in greater detail in the document entitled "J2EE Connector Architecture Specification", JSR 016, Version 1.0, Final Release, Released Aug. 22, 2001 from Sun Microsystems, Inc. of Palo Alto, Calif., the contents of which are hereby incorporated herein by reference.

Through communication with IDE 306, a RTA 308 will, responsive to a request, provide data describing the services which are available from an EIS 312 (e.g., database facilities, transaction facilities, security authorization services, etc.). In addition to communicated services, a RTA 308 provides data to IDE 306 which details how to invoke a service (e.g., the parameters to use, the location of a service and the like). In the exemplary embodiment, the operations and functionality of a J2EE connector is extended by a Web Services Description Language (WSDL) document. The J2EE Connector Architecture provides a standard client programming model for accessing EIS services. However, as will be appreciated by those of ordinary skill in the art, other connector architectures, such as the Common Connector Framework (CCF) from International Business Machines Corporation, which are designed to be used by applications during runtime to communicate with back end system could equally be employed.

The WSDL elements include two aspects (described in greater detail below with reference to FIG. 6): the first aspect provides an abstract service interface definition; the second aspect provides data on how to interact with a service specified by the first aspect and the location of a service. The second aspect which forms part of a RTA 308 is described in greater detail below with reference to FIG. 6 and is hereinafter referred to as the "extensibility elements".

WSDL provides a standard way for describing which services are offered by a specific EIS instance, and how you access them. WSDL, in XML format, describes network services as a set of endpoints operating on messages containing either document-oriented or procedure-oriented information. The operations and messages are described abstractly and then bound to a concrete network protocol and message format to define an endpoint. Related concrete endpoints are combined into abstract endpoints (services). WSDL is extensible to allow description of endpoints and their messages regardless of what message formats or network protocols are used to communicate. WSDL can be better understood with reference to the World Wide Web Consortium (W3C) document entitled "Web Services Description Language (WSDL) 1.1" dated Mar. 15, 2001 the contents of which are hereby incorporated herein by reference. While the exemplary embodiment described herein utilizes WSDL, other languages which describe services could also be employed. As will be appreciated by those of ordinary skill in the art, other languages to describe the services of an EIS and how to invoke those services could equally be employed. For example, it is contemplated that the Electronic Business XML (ebXML) language promulgated, in part, by the United Nations Centre for Trade Facilitation and Electronic Business (UN/CEFACT) could, alternatively, be employed.

A document from the Sun Microsystems, Inc. (Java Community Process group) of Palo Alto, Calif. entitled JSR 110 "Java APIs for WSDL" describes a proposed standard set of APIs for representing and manipulating services described by WSDL documents. These APIs define a way to construct and manipulate models of service descriptions. The contents of "Java APIs for WSDL" is hereby incorporated herein by reference.

RTAs 308 also communicate with business applications 310 (during runtime), EISs 312 (during runtime and, in an one embodiment—the exemplary embodiment—of the present invention, also during the development process) and application server 314. The communication between RTAS 308 and the other components of computer system 100 (illustrated as forming part of memory 204 in FIG. 3) is best understood with reference to FIGS. 4-8, described below.

EISs 312 (which include individual EIS 312a, 312b, . . . 312i) are conventional enterprise information systems. These may include, for example, databases for human resource data, inventory data and the like, ERPs, transaction servers, etc. Any type of EIS 312 which may be used to facilitate an e-commerce or e-business transaction may be employed.

A business application 310 (a plurality of business applications, 310a, 310b, . . . , 310i are illustrated in FIG. 3), which may or may not have been developed by IDE 306, employs or uses the services of one or more EISs 312 through communication with RTAS 308 during runtime. An IDE is used to develop a business application 310 to use and employ the services of an EIS 312. In the exemplary embodiment the information required by the IDE to use the services for an EIS 312 is obtained from data describing the services available and how to invoke or use these services from a RTA 308.

Application server 314 is a conventional application server that hosts or connects to, during runtime, one or more RTAS 308. An application server 314 assists in the communication between an EIS 312 and a business application 310 (through RTA 308) that is attempting to utilize the services provided by the EIS 312.

Figure 4:
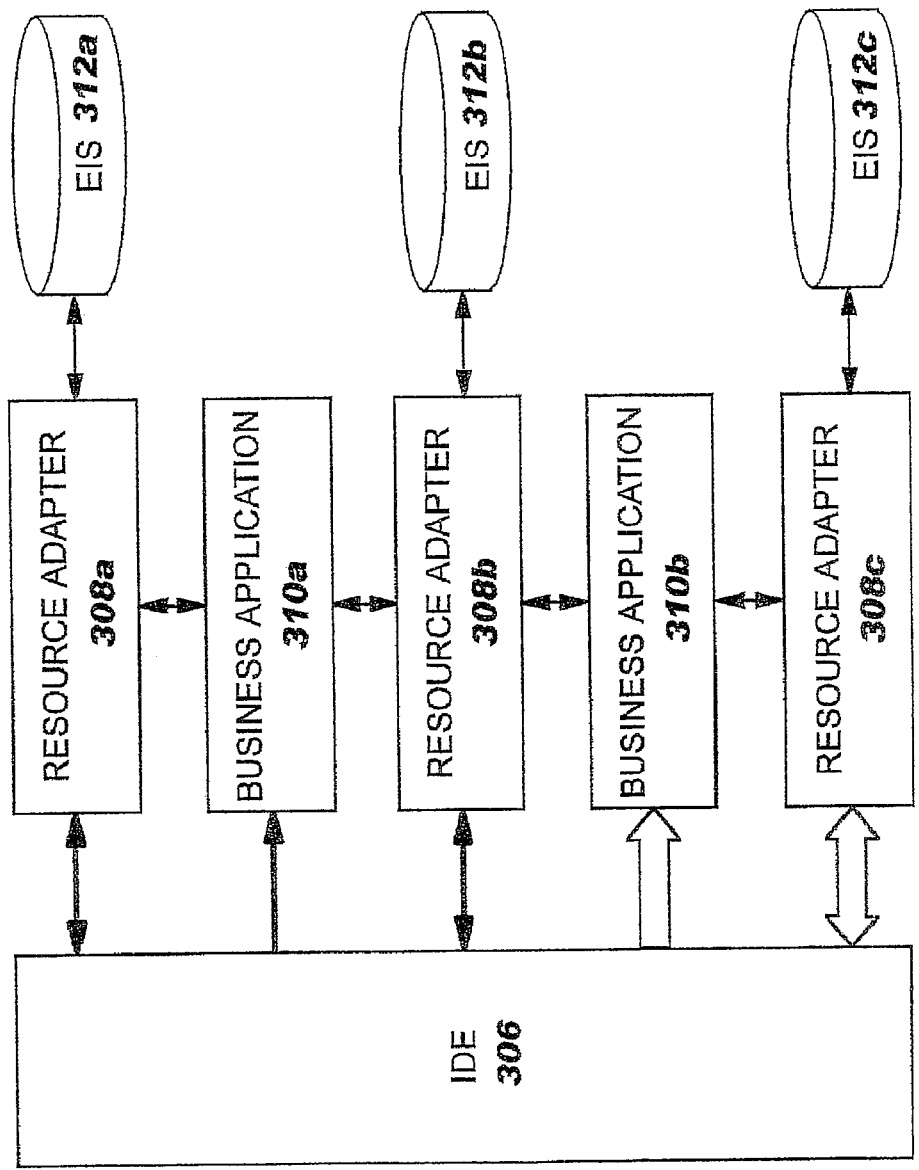
FIG. 4 is a illustrates a first interaction of some of the components of FIG. 2 during the development of a plurality of business applications.

With reference to FIG. 4, the interaction of some of the components shown in FIG. 3 is schematically illustrated. As indicated by FIG. 4, each RTA 308 is associated with a selected EIS 312. In FIG. 4, business application 310a is being developed (through the development facilities of IDE 306) that requires use of the services of two EISs: EIS 312a and EIS 312b. To generate the source code necessary to access the services of EISs 312a, 312b, two corresponding RTAs 308a, 308b are plugged into IDE 306. By plugging RTAs, IDE 306 is provided data describing the services available from the EIS 312 associated with a particular RTA 308 (i.e., IDE 306 will be provided data describing the services of EIS 312a by associated RTA 308a; RTA 308b will similarly provide data describing the services of EIS 312b to IDE 306). Through this information received from RTAs 308a, 308b, IDE 306 is able to assist in the generation of business application 310a which, during runtime, will use the services of EISs 312a, 312b. It is to be noted that while business application 310a is shown as being in communication with RTAs 308a and 308b (illustrated by way of a dashed arrow), in the exemplary embodiment there is no direct communication between a business application 310 under development and a RTA. Rather, the dashed arrows are used to illustrate that there is indirect communication between a business application 310 under development and one or more RTAS 308 (this indirect communication provided through the communication between IDE 306 and RTAS 308). In fact, only during runtime is a business application 310 aware of the existence of a RTA 308.

During development and in the exemplary embodiment, a RTA 308 has two functions included in a WSDL document (described briefly above, in greater detail below) which are invoked by IDE 306. The two functions are invoked to ascertain the services provided by an associated or corresponding EIS 312 and how to use or invoke these services. This document is, in the exemplary embodiment, the only source of information for obtaining data describing the services of an EIS 312 during the development of a business application 310. The WSDL document which forms part of each RTA 308 in the exemplary embodiment, is created prior to a RTA 308 being plugged into IDE 306. Using the functions provided by RTA 308, communication with EIS 312 will be initiated by RTA 308 to retrieve a list of the services provided by the EIS 312 and a description of those services. In the exemplary embodiment the list of services is a simple character string but other formats (e.g., arrays, XML documents, etc.) could equally be employed. A description for each of the services listed is, in the exemplary embodiment, provided by RTA 308 to IDE 306 in the form of a single WSDL document (although other data formats could equally be employed) describing all of the services. However, it is contemplated that a single document (whether in the form of WSDL documents or documents conforming to a different standard) each describing only a single service could also be employed. In this case, IDE 306 would be provided with one or more documents describing the services of EIS 312.

Other methods of providing the list of services provided by EIS 312 and description of those services listed may be employed. For example, RTA 308 may include data which lists the services. This data, which forms part of RTA 308 prior to RTA 308 being plugged into IDE 306, may be accessed by the IDE 306. A description of the services listed may then require communication with EIS 312. In a variation to this described alternative, the list of services provided by EIS 312, which forms part of RTA 308 may be updated by communication with EIS 312. In a further alternative, both the list of services provided by EIS 312 and a description of those services may form part of RTA 308. Invoking the functions of RTA 308 could then return the list and description to IDE 306. In a variation to the further alternative described above, the list of services and description of these same services could be updated by communication with EIS 312.

Also shown in FIG. 4 is business application 310b which is also created through the facilities of IDE 306. In the case of application 310b, access to the services provided by EIS 312c is described to IDE 306 by a RTA 308 associated (or designed to interact) with EIS 312c (namely, RTA 308c). The information obtained from RTA 308c is used by IDE 306 to assist in the development of application 310b.

Figure 5:
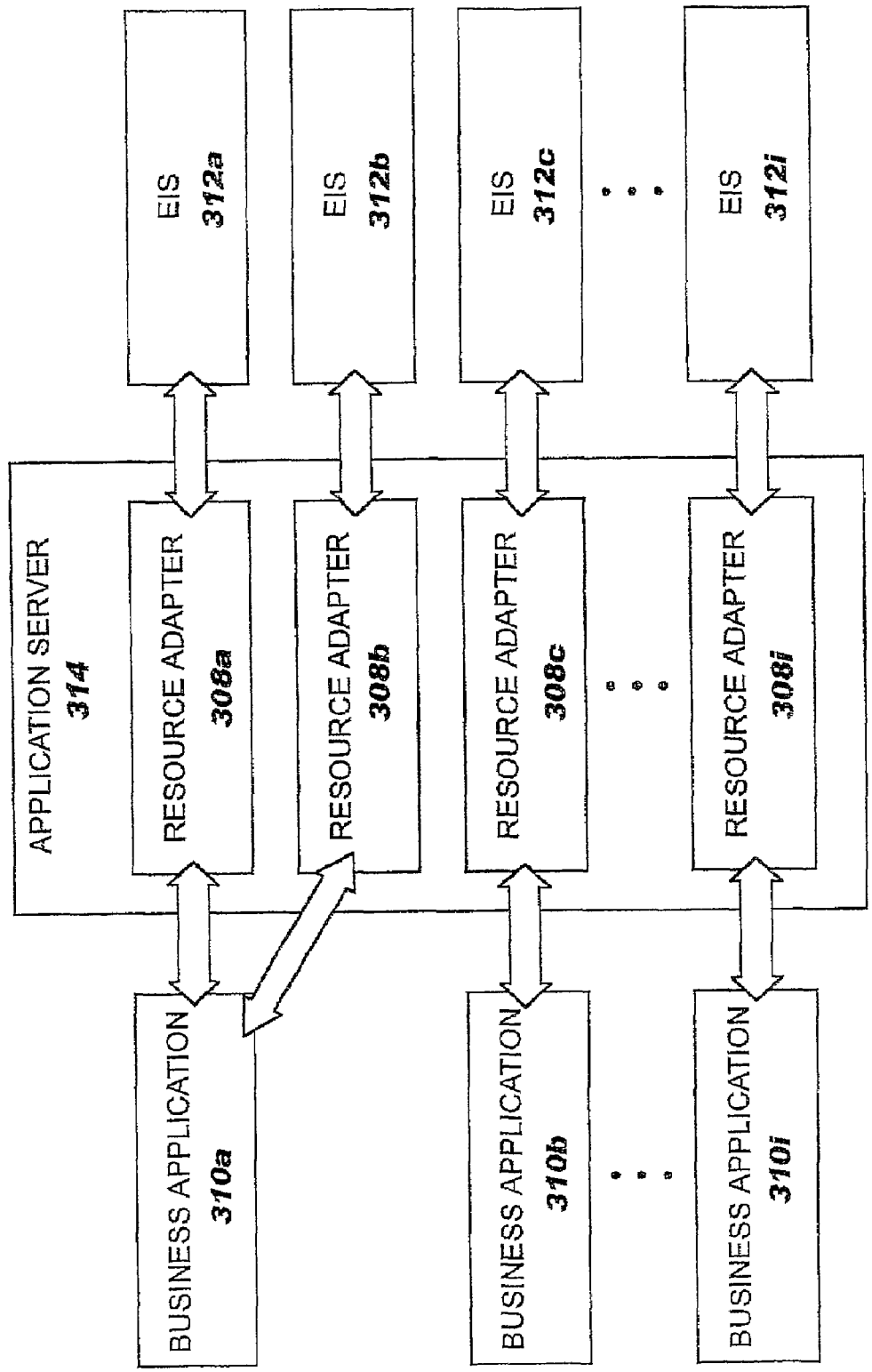
FIG. 5 is a illustrates a second interaction of some of the components of FIG. 2 during the operation of business applications developed employing aspects of the present invention.

FIG. 5 illustrates an exemplary runtime environment which embodies aspects of the present invention. As shown, application server 314 hosts RTAs 308a, 308b, 308c, . . . , 308i. Each RTA 308 facilitates communication between a corresponding EIS 312 and at least one business application 310. A single business application 310 may communicate with one or more RTAS 308. For example, business application 310a is shown communicating with two EISs 312 (namely EIS 312a and 312b) via corresponding RTAs 308a, 308b. Similarly, business applications 310b and 310i communicate with EISs 312c and 312i, respectively, through operation of RTAs 308c and 308i, respectively. A single adapter 308 could also be used simultaneously by more than one business application 310 (although this is not illustrated).

Figure 6:
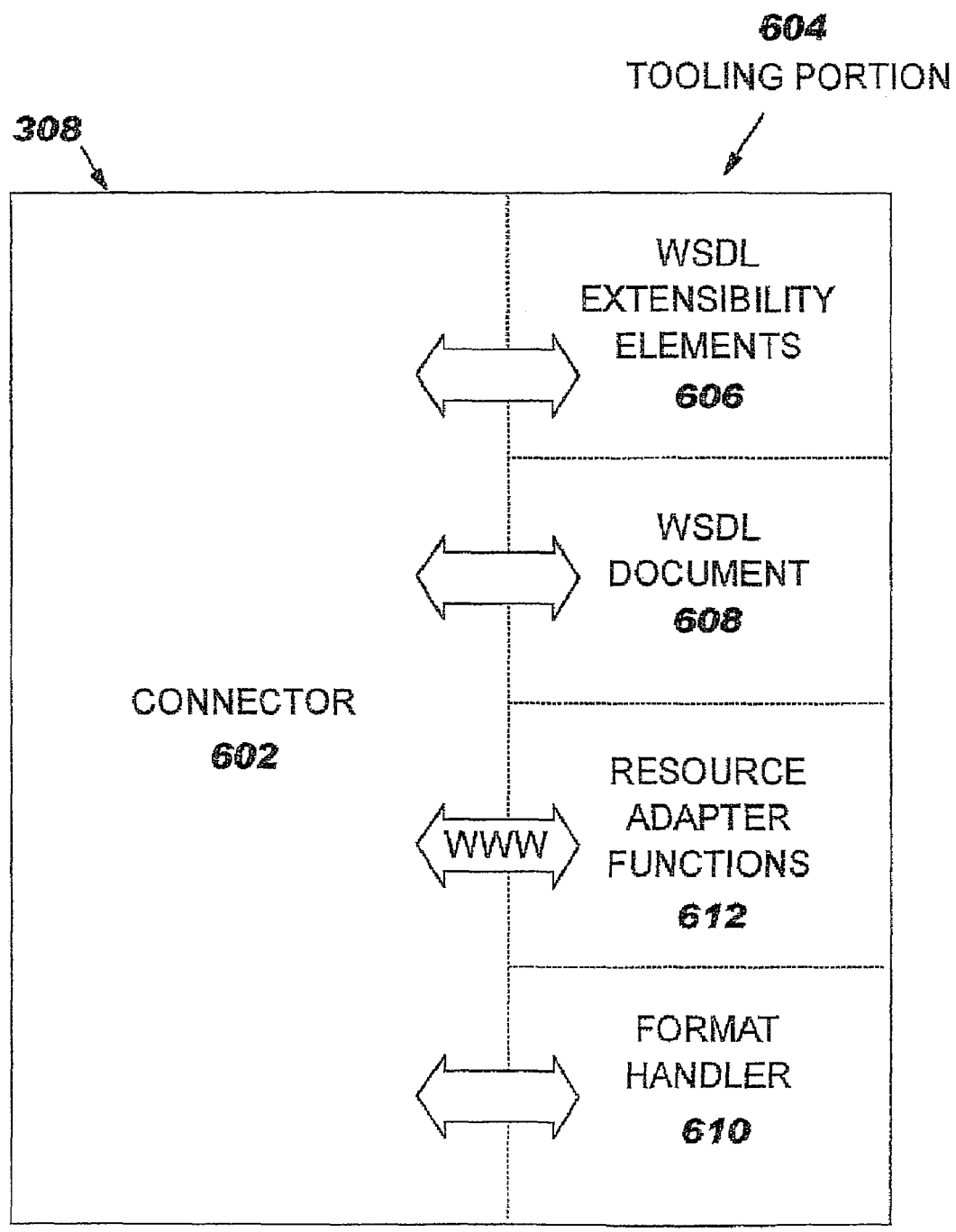
FIG. 6 illustrates, in greater detail and in functional block form, a portion of FIG. 3.
Figure 6A:
FIG. 6a illustrates, in greater detail and in functional block form, a portion of FIG. 6.

An exemplary RTA 308 is illustrated in greater detail in FIG. 6. As shown, RTA 308 includes a connector portion 602 combined with RTA tooling portion 604. The tooling portion 604 includes RTA functions 612 and a format handler generator 610. The WSDL document(s) 608 and extensibility elements 606 are in the exemplary embodiment retrieved or created as a result of interaction between RTA 308 and IDE 306.

In the exemplary embodiment connector portion 602 is embodied in a J2EE connector. As a cursory overview a J2EE connector includes the following: a connection element and an interactive element which includes an Interaction and an InteractionSpec element. The Connection element operates to create and manage connections between an application server (e.g., application server 314) and a connector 602. The interactive elements (Interaction and InteractionSpec elements) provide the mechanism to drive an interaction between a RTA and the associated EIS 312. The Interaction element enables the execution of specific EIS functions. In the J2EE architecture, the Interaction element includes an execute method that takes an input record, an output record and an InteractionSpec element. The execute method executes the EIS function represented by the InteractionSpec element. The InteractionSpec element holds properties for driving interaction (using an Interaction element) with an EIS 312.

The extensibility elements 606 extend the definition of the base elements (port, operation, input and output messages) in the WSDL document. That is, the definition of these base elements are extended with details which are used to map between the functionality of the connector 602 (which is, in the exemplary embodiment, a J2EE connector) and the services which are abstractly defined by the abstract services information document 608. The mapping between the J2EE connector artifacts and the elements 606 are indicated in Table I below.

TABLE I

| J2EE Connector Element | WSDL Elements |
| --- | --- |
| Connection | port |
| Interaction | operation |
| InteractionSpec | operation binding |
| Record | input message |
| Record | output message |

It may be desirable in some circumstances to establish further extend the input and/or output messages. This would enable a mechanism which defines the translation of the messages into the data type of the underlying EIS system. In the exemplary embodiment, the input and output messages are bound to the Streamable.write and Streamable.read elements of the J2EE connector 602.

Binding, in WSDL, refers to a process associating a protocol or data format information with an abstract entity like a message, operation, or port.

Exemplary pseudo-code (in Extensible Markup Language—XML) is shown below:

<definitions . . . >
<binding . . . >
<connector:binding . . . interaction attributes . . . >
<operation . . . >
<connector:operation functionName="name". . . interaction attributes . . . >
<input>
. . . Format bindings may be applied here . . .
</input>
<output>
. . . Format bindings may be applied here . . .
</output>
<fault>*
. . . Format bindings may be applied here . . .
</fault>
</operation>
</binding>
<port . . . >
<connector:address hostName="uri" portNumber=". . . ".
. . connection attributes . . . />
</port>
</definitions>

As will be appreciated by those of ordinary skill in the art, the namespace, and its identifier, should be defined in an earlier section of the WSDL document.

The connector:binding structure signifies that the binding is bound to a selected connector (in the exemplary embodiment connector 602 which is embodied by a J2EE connector architecture-based connector). The identifier connector is the short name for the namespace that identifies a particular connector. For example, the code <cics:binding . . . /> identifies the connector 602 as being a RTA for a Customer Information Control System (CICS)—an EIS 312. The connector:binding structure may optionally contain InteractionSpec attributes that are valid for the operations bound to a selected port.

The connector:operation structure contains the InteractionSpec attributes so that an operation on the EIS 312 can be executed. For example, the following code binds the function GETCUST on the EIS 312 (a CICS server):

<cics:operation functionName="GETCUST"/>

The connector:address structure contains the ManagedConnectionFactory attributes so that an the connection factory (which forms part of the Connection elements described above) can be appropriately configured. The following pseudo-code is exemplary of setting the URL and name of a CICS server (an EIS 312):

<cics:address connectionURL=". . . " serverName=". . . "/>

The abstract services information document 608 (which in the exemplary embodiment is a WSDL document) provides an abstract description of the services provided by an associated EIS 312. Hereinafter the abstract services information document 608 will be referred to as the WSDL document 608 for ease of reference.

RTA functions 612 (hereinafter functions 612) are described in a WSDL document (although other languages could equally be employed). Functions 612 are two functions or methods which can be invoked: FindService and GetAbstractServiceInformationDocuments (which in the exemplary embodiment is renamed GetWSDLDocuments).

The first function, FindService (which persons of ordinary skill in the art is simply an exemplary function name), is used by an IDE 306 to query the names of all the functions (or services or operations—collectively "services") offered by a particular EIS 312. The FindService function is used so that client code can be created which can access the services identified by the calling of the FindService function. As such, the FindService function is used by an IDE 306 as a mechanism to identify the set of possible services for which code can be created. The FindService function, when invoked by an IDE 306 causes RTA 308, in the exemplary embodiment, to establish communication with its associated EIS 312. Once communication has been established, RTA 308 will query EIS 312 to determine the services provided by the EIS 312. Once determined, RTA 308 will return a list of the services to IDE 306. The list of services is provided to IDE 306, in the exemplary embodiment, in the form of a character string. However, other data formats (e.g., arrays, XML documents, etc.) could alternatively be employed.

The second function, GetWSDLDocuments in the exemplary embodiment, is used by an IDE 306 to retrieve the descriptions for the particular functions identified using the FindService function. These descriptions provide the necessary information (including the connector bindings) such that an IDE 306 can generate the necessary code (forming part of a business application 310) to interact with the service provided by an EIS. In the exemplary embodiment, a single WSDL document is returned to IDE 306 which describes every service listed in the data returned by the call to FindService. The single WSDL document returned by GetWSDLDocuments forms the WSDL document 608 (FIG. 6). As will be appreciated, other data formats (e.g., using a different description language, returning one document for each service returned by FindService) could be employed in alternative embodiments.

It should be noted that while these two functions (FindService and GetWSDLDocuments) are described in the exemplary embodiments as being implemented internally as part of a RTA 308, these two functions could, in an alternative embodiment, be implemented by an EIS 312, or implemented in some other repository. However, providing the functions 612 as part of a RTA 308 ensures that an IDE 306 has a simple mechanism to identify where, and how, to access the services provided by an EIS 312 since the functions and the information the functions access (stored as part of the WSDL document 608) and extension elements 606 are, ultimately, packaged as part of a RTA 308.

Format handler generator 610 provides a mechanism that can be used by IDE 306 to generate code for handling the different data formats employed by the EIS 312 and the business application 310 which is designed to use the services of the EIS 312. That is, the data types of the business application 310 and the data types of the EIS 312 may differ. Accordingly, an IDE 306 tasked with creating business application 310 must also generate a format handler as part of business application 310 to essentially convert between the data types of the business application and the EIS. As such, in the exemplary embodiment, RTA 308 provides format handler generator 610 which is used by IDE 306 to generate the code to perform this conversion service. As will be appreciated, format handler generator 610 need not form part of RTA 308 but could, in alternative embodiments, be provided by another repository (i.e., be separated from RTA 308).

To invoke a service on EIS 312 using a RTA 308 the exemplary embodiment requires certain data (or metadata): the connection properties so that the connector 602 (using the ManagedConnectionFactory interface) can be used to create a physical connection to the EIS 312 associated with the RTA 308; the interaction properties to be used with the Interaction Spec element of the connector 602; the record to be used and its structure to communicate with an EIS 312; and the operation offered by the EIS 312.

As noted above by Table I, there is a binding, association or mapping between services associated with the EIS 312 and the corresponding portions of the connector 602 (which, in the exemplary embodiment, is a J2EE connector).

The exemplary binding between input and output messages and the Streamable.write and Streamable.read, respectively, provides the link between messages sent to an EIS 312 and messages returned by the EIS 312. As will be appreciated by those of ordinary skill in the art, the structure of the messages and their associate format must be ensured so that an EIS 312 can interpret messages received from a RTA 308. Similarly, messages from an EIS 312 to a business application 310 need to be formatted and structured in a manner which can be interpreted by the business application. This conversion between formats is handled by a format handler generated using the functionality provided by format handler generator 610.

The operations of IDE 306, RTAs 308 (and the components thereof), a business application 310, an EIS 312 may be better understood with reference to the operations illustrated in FIG. 7. Operations 700 are performed during the creation of a business application 310 designed to interact with an EIS 312. The creation of business application 310 will be created through the operation and interaction between IDE 306 and a RTA 308. The created business application 310 will, during runtime, use the same RTA 308 (and, more particularly, the connector portion 602) to use the services of an EIS 312.

Initially, IDE 306 receives data indicating that the business application 310 being developed by a user requires interaction with various services provided by a selected EIS 312 (S702). The data received may be provided through mouse clicks or other means of data entry. Responsive to the received request, IDE 306 attempts to locate whether a RTA for the selected EIS 312 is available (S704). Such a determination may be made by accessing a lookup table or querying a repository which identifies those RTAS 308 which have been "plugged" into the IDE 306. If the required RTA 308 (determined by the search performed in S704 based on the identity of the selected EIS 312) is not available (S706), IDE 306 is unable to generate the code required (S708). In such an instance, the user of IDE 306 may be provided a warning message and, in some embodiments, prompted to provide a RTA 308 (or the location of such) which is adapted to interact with the selected EIS 312.

If, however, IDE 306 locates in S704/S706 that the required RTA 308 is available, a query is transmitted to the RTA 308 requesting identification of the services which are provided by the EIS 312 with which the RTA is associated (S710). Responsive to this request to RTA 308, RTA calls the FindService function (which forms part of functions 612—FIG. 6). IDE 306 uses the WSDL document to invoke the FindService function of RTA 308. The WSDL document provides the information necessary to IDE 306 to invoke this function. In the exemplary embodiment each RTA 308 implements the FindService function internally. However, the FindService function, in alternative embodiments, could be delegated to the associated EIS 312 or some other repository. (As noted above, alternative embodiments may update or generate WSDL document 608 responsive to a request for identification of services received from IDE 306. These alternative embodiments may involve RTA 308 communicating with EIS 312 to update WSDL document 608.)

If RTA 308, responsive to a request received (S710) returns a null list of service or fails to respond (S712), IDE 306 will be unable to assist in generating code for application 310 (S714). However, if a list of services provided by EIS 312 is successfully returned by RTA 308 (as a result of communication with EIS 312) to IDE 306, IDE 306 is able to present to a user the identities of these services (S716). The services may be presented using the GUI of IDE 306 in a manner known to those of ordinary skill in the art (e.g., in a pane, separate window, as a drop down list, etc.).

Responsive to the services presented to a user (or at some later point in time), IDE 306 may receive data indicative of a user's selection of (i.e., desire to use) one or more of the services offered by the EIS 312 and presented to the user in S716 (S718). The received user selection data may be in any known form (e.g., mouse clicks, data entry, or the like).

On receipt of the user selection data (S718), IDE 306 will invoke the GetWSDLDocuments function (a portion of functions 612) of the RTA 308 (S722). If the invocation of the GetWSDLDocuments is unsuccessful (e.g., no WSDL documents 608 are returned, IDE 306 receives no response, etc.) (S722), IDE 306 will be unable to assist a user in generating code for a business application 310 which utilizes the functions selected in S718 (S724). If there is such a failure, IDE 306 may inform a user through the display of an error message, warning or the like.

However, if a WSDL document(s) 608 is returned (as a result of communication between RTA 308 and EIS 312), IDE 306 will (having mapped the connector 602 elements to the extensibility elements 606) then be able to generate code for business application 310 which accesses the services provided by EIS 312.

As will be appreciated by those of ordinary skill in the art, IDE 306 may have, serially or simultaneously, more than one RTA 308 "plugged in" during the creation of a business application 310.

Operations 800 (FIG. 8), shown in flow chart form, illustrate the operations performed during the runtime of a business application 310 developed using IDE 306 and a RTA 308. During execution (or during initialization) business application 310 will establish communication with RTA 308 (which is hosted application server 314—FIG. 4) (S802). During operation S802 (and the remainder of operations 800) business application 310 will only communicate with RTA 308 using the facilities provided by the connector portion 602 (i.e., the functionality provided by RTA enhancements 604 are not employed during operations 800). After communication between RTA 308 and business application 310 has been established (S802), requests for services from EIS 312 made by business application 310 will be brokered by the operation of RTA 308 (S804). When the services of EIS 312 are no longer required by business application 310, communication with RTA 308 may be terminated (S806). Such a termination may occur, for example, during the continued execution of business application 310 or during a process to terminate execution of business application 310.

As will be appreciated by those of ordinary skill in the art, any business application (regardless of whether created through use of IDE 306 or a conventional IDE (i.e., an IDE that does not leverage the inventive aspects of RTA 308 but rather uses a conventional adapter tool to create code to access an EIS)) could also be used in place of business application 310. Similarly, a business application designed to employ a RTA, could use either a RTA 308 (embodying aspects of the present invention) or a connector 602 only.

As will be appreciated by those skilled in the art, modifications to the above-described embodiment can be made without departing from the essence of the invention. For example, the enhancements portion 604 (FIG. 6) of RTA 308 could be separated from the connector portion 602. In this embodiment, only portion 604 need be "plugged" into IDE 306 during development. However, unlike the adapter-tool sets described above, the enhancements portion 604 would be responsible for communicating with its corresponding connector 602 that may be deployed on some other system. In a further alternative, the two RTA functions described above, FindService and GetWSDLDocuments, could be combined into a single function. Alternatively, the two functions could be called simultaneously or serially (i.e., without other intervening actions).

The present invention is directed to resource adapters and an integrated development environment.

In one aspect of the present invention a resource and tooling adapter (RTA), a new kind of resource adapter, interacts, in the development process, with an integrated development environment (IDE). The RTA, responsive to a request from the IDE, provides identification of the services provided by the EIS. Additionally, the RTA provides data to the IDE describing how to access or invoke those services. Utilizing the data (describing the services and how to use those services of an EIS) an IDE is able to generate a business application designed to exploit the services of the ELS.

In a further aspect of the present invention, the RTA (previously employed by an IDE to develop a business application) also provides runtime support to enable communication between the business application and the selected EIS.

Advantageously, providers of resource adapter-tool sets need only develop a single RTA which can be used during both the development process and during runtime of the developed business application.

In a further advantage, all IDES, developed or modified to interact with RTAs embodying aspects of the present invention, will be enabled to create business applications for every EIS for which a RTA, embodying aspects of the present invention, has been developed.

In a still further advantage, developers, comfortable or preferring a particular IDE, will not be forced to switch to a different IDE as they may have been forced to previously. As noted above, a switch to a different IDE may be forced when a resource adapter-tool set did not exist for a developer's preferred IDE when a business application which accesses a selected EIS needed to be developed.

Other advantages of the present invention will be apparent to those of ordinary skill in the art upon reading and understanding of the entirety of the present application.

In accordance with an aspect of the present invention there is provided a resource adapter comprising: a first mechanism providing a description of a service provided by an enterprise information system sufficient to invoke said service; a second mechanism for invoking said service described; said resource adapter adapted to communicate with an integrated development environment to assist in development of a business application; and said resource adapter further adapted to communicate with a business application during execution of said business application.

In accordance with still another aspect of the present invention there is provided a method for generating code for a business application, said code adapted to use a connector to access a service provided by an Enterprise Information System (EIS), said method comprising: receiving data describing said service provided by said EIS; mapping said data describing said service to elements of said connector; generating code of said business application, said code implementing said mapping.

In accordance with another aspect of the present invention there is provided an integrated development environment (IDE) for generating a business application, said business application, when executed, uses services provided by an enterprise information system (ELS), said IDE comprising: an interface for querying a resource and tooling adapter to ascertain a service provided by said ELS; said interface for receiving a response to a query from a resource and tooling adapter, said response describing said service provided by said EIS and information to invoke said service; and a generator generating code for said business application to access said service, said code using data from said response.

In accordance with another aspect of the present invention there is provided a computer readable media storing data and instructions readable by a computer system, said computer system executing an integrated development environment (IDE) for generating a business application to access a service provided by an Enterprise Information System (EIS), said data and instructions defining a resource and tooling adapter that, when deployed on said computer system, adapts said IDE to: obtain a description of said service, said description providing details required to invoke said service; and using said description of said service, generate code which when executed, communicates with said resource and tooling adapter to use said service.

In accordance with another aspect of the present invention there is provided a resource adapter comprising: first means for communicating with an integrated development environment (IDE) during development of a business application; second means for communicating with an Enterprise Information System (EIS); third means for communication with an executing business application; fourth means for providing a description of a service provided by said EIS to said IDE; and fifth means for mapping aspects of said description of said service to said third means.

In accordance with another aspect of the present invention there is provided a method of adapting an integrated development environment to enable generation of code to use a service provided by a back end system, said method comprising: transmitting to said integrated development environment data describing said service; and mapping elements of said data describing said service to elements of a connector, said connector for facilitating communication between said back end system and an application generated to use said service provided by said back end system.

In accordance with another aspect of the present invention there is provided a resource adapter comprising: a connector adapted to facilitate. during execution of an application, communication between said application and a back end system resulting in said application using a service provided by said back end system; functions to provide an integrated development environment with a description of said service wherein said elements of said description map to elements of said connector.

Other aspects and features of the present invention will become apparent to those ordinarily skilled in the art upon review of the following description of specific embodiments of the invention in conjunction with the accompanying figures.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method for generating, in an Integrated Development Environment (IDE), a software application that is designed to exploit services of multiple Enterprise Information Systems (EISs), the method comprising:

receiving, in an Integrated Development Environment (IDE), data indicating that a software application is being developed for an application that requires an interaction with needed services from multiple Enterprise Information Services (EISs), wherein the IDE provides a developer with a development environment using a Graphical User Interface (GUI), wherein the GUI includes multiple windows for viewing source code, project files, and debugging information;

responsive to the data being received, querying, by the IDE, whether Resource and Tooling Adapters (RTAs) for the multiple EISs are available, wherein the RTAs provide an IDE with access to needed multiple EISs;

in response to the querying determining that required RTAs for accessing multiple EISs are not available, issuing a warning that the multiple EISs are not accessible through the required RTAs;

in response to the querying determining that the required RTAs for accessing the multiple EISs are available, transmitting a query to the required RTAs requesting identification of the needed services that are provided from the multiple EISs with which the required RTAs are associated;

locating, by the multiple EISs, the needed services;

presenting, by the IDE, the needed services to a separate window in a Graphical User Interface (GUI) that is supported by the multiple EISs;

in response to the needed services being presented to the separate window in the GUI, receiving, by the IDE, data that is indicative of which needed services are selected by a user;

in response to the IDE receiving the data that is indicative of which needed services are selected by the user, invoking a "get documents" command from the IDE to the required RTAs, wherein the "get documents" command instructs the required RTAs to locate abstract services documents, in the required RTAs, that provide abstract descriptions of the needed services provided by the multiple EISs; and in response to the "get documents" command succeeding in locating the abstract services documents as a result of communication between the required RTAs and the needed multiple EISs, generating, in the IDE, code that accesses the needed services for the software application, wherein the needed services are provided by the needed multiple EISs.

2. The method of claim 1, wherein the querying, by the IDE, whether RTAs for the multiple EISs are available is performed by querying a repository to identify which RTAs have been plugged into the IDE.

3. A method for generating, in an Integrated Development Environment (IDE), a software application that is designed to exploit services of multiple Enterprise Information Systems (EISs), the method comprising:

associating each of multiple Resource and Tooling Adapter (RTAs) with a selected one of multiple Enterprise Information Services (EISs);

identifying a software application that is being developed through development facilities of an Integrated Development Environment (IDE), wherein the software application requires use of services provided by multiple EISs, wherein the multiple EISs include at least one database describing transaction servers available to the software application, wherein the IDE provides a developer with a development environment using a Graphical User Interface (GUI) and wherein the GUI includes multiple windows for viewing source code, project files, and debugging information;

generating source code necessary to access the services of the multiple EISs by plugging multiple corresponding RTAs into the IDE; and through plugged-in multiple corresponding RTAs into the IDE, providing data, to the IDE, that describes services available from the multiple EISs to the software application, wherein there is no direct communication between the software application and the multiple RTAs while the software application is under development in the IDE, and wherein the software application is aware of the multiple RTAs only during runtime.

4. The method of claim 3, wherein the multiple EISs include at least one database for human resources data.

5. The method of claim 3, wherein the multiple EISs include at least one database for inventory data.

6. The method of claim 3, wherein the multiple EISs include at least one database for Enterprise Resource Planning (ERP).

7. A method for generating, in an Integrated Development Environment (IDE), a software application that is designed to exploit services of multiple Enterprise Information Systems (EISs), the method comprising:

associating a single Resource and Tooling Adapter (RTA) with multiple Enterprise Information Services (EISs);

identifying a software application that is being developed through development facilities of an Integrated Development Environment (IDE), wherein the software application requires use of services provided by multiple EISs, wherein the multiple EISs include at least one database describing transaction servers available to the software application, and wherein the IDE provides a developer with a development environment using a Graphical User Interface (GUI) that includes multiple windows for viewing source code, project files, and debugging information;

generating source code necessary to access the services of the multiple EISs by plugging the single RTA into the IDE; and through a plugged-in single RTA, providing data, to the IDE, that describes services available from the multiple EISs to the software application, wherein there is no direct communication between the software application and the single RTA while the software application is under development in the IDE, and wherein the software application is aware of the single RTA only during runtime.

8. The method of claim 7, wherein the multiple EISs include at least one database for human resources data.

9. The method of claim 7, wherein the multiple EISs include at least one database for inventory data.

10. The method of claim 7, wherein the multiple EISs include at least one database for Enterprise Resource Planning (ERP).

11. A computer-readable medium encoded with a computer program that, when executed, performs the steps of:

receiving, in an Integrated Development Environment (IDE), data indicating that a software application is being developed for an application that requires an interaction with needed services from multiple Enterprise Information Services (EISs);

responsive to the data being received, querying, by the IDE, whether Resource and Tooling Adapters (RTAs) for the multiple EISs are available, wherein the RTAs provide an IDE with access to needed multiple EISs;

in response to the querying determining that required RTAs for accessing multiple EISs are not available, issuing a warning that the multiple EISs are not accessible through the required RTAs;

in response to the querying determining that the required RTAs for accessing the multiple EISs are available, transmitting a query to the required RTAs requesting identification of the needed services that are provided from the multiple EISs with which the required RTAs are associated;

locating, by the multiple EISs, the needed services;

presenting, by the IDE, the needed services to a separate window in a Graphical User Interface (GUI) that is supported by the multiple EISs;

in response to the needed services being presented to the separate window in the GUI, receiving, by the IDE, data that is indicative of which needed services are selected by a user;

in response to the IDE receiving the data that is indicative of which needed services are selected by the user, invoking a "get documents" command from the IDE to the required RTAs, wherein the "get documents" command instructs the required RTAs to locate abstract services documents, in the required RTAs, that provide abstract descriptions of the needed services provided by the multiple EISs; and in response to the "get documents" command succeeding in locating the abstract services documents as a result of communication between the required RTAs and the needed multiple EISs, generating, in the IDE, code that accesses the needed services for the software application, wherein the needed services are provided by the needed multiple EISs.

12. The computer-readable medium of claim 11, wherein the querying, by the IDE, whether RTAs for the multiple EISs are available is performed by querying a repository to identify which RTAs have been plugged into the IDE.

13. A computer-readable medium encoded with a computer program that, when executed, performs the steps of:

associating each of multiple Resource and Tooling Adapter (RTAs) with a selected one of multiple Enterprise Information Services (EISs);

identifying a software application that is being developed through development facilities of an Integrated Development Environment (IDE), wherein the software application requires use of services provided by multiple EISs, wherein the multiple EISs include at least one database describing transaction servers available to the software application, and wherein the IDE provides a developer with a development environment using a Graphical User Interface (GUI) that includes multiple windows for viewing source code, project files, and debugging information;

generating source code necessary to access the services of the multiple EISs by plugging multiple corresponding RTAs into the IDE; and through plugged-in multiple corresponding RTAs into the IDE, providing data, to the IDE, that describes services available from the multiple EISs to the software application, wherein there is no direct communication between the software application and the multiple RTAs while the software application is under development in the IDE, and wherein the software application is aware of the multiple RTAs only during runtime.

14. The computer-readable medium of claim 13, wherein the multiple EISs include at least one database for human resources data.

15. The computer-readable medium of claim 13, wherein the multiple EISs include at least one database for inventory data.

16. The computer-readable medium of claim 13, wherein the multiple EISs include at least one database for Enterprise Resource Planning (ERP).

17. A computer-readable medium encoded with a computer program that, when executed, performs the steps of
associating a single Resource and Tooling Adapter (RTA) with multiple Enterprise Information Services (EISs);
identifying a software application that is being developed through development facilities of an Integrated Development Environment (IDE), wherein the software application requires use of services provided by multiple EISs, wherein the multiple EISs include at least one database describing transaction servers available to the software application, and wherein the IDE provides a developer with a development environment using a Graphical User Interface (GUI) that includes multiple windows for viewing source code, project files, and debugging information;
generating source code necessary to access the services of the multiple EISs by plugging the single RTA into the IDE; and
through a plugged-in single RTA, providing data, to the IDE, that describes services available from the multiple EISs to the software application, wherein there is no direct communication between the software application and the single RTA while the software application is under development in the IDE, and wherein the software application is aware of the single RTA only during runtime.

18. The computer-readable medium of claim 17, wherein the multiple EISs include at least one database for human resources data.

19. The computer-readable medium of claim 17, wherein the multiple EISs include at least one database for inventory data.

20. The computer-readable medium of claim 17, wherein the multiple EISs include at least one database for Enterprise Resource Planning (ERP).

* * * * *